United States Patent
Yadav et al.

(10) Patent No.: US 12,046,773 B2
(45) Date of Patent: Jul. 23, 2024

(54) BATTERY MODULE COVER WITH THERMAL RUNAWAY MITIGATION

(71) Applicant: GM GLOBAL TECHNOLOGY OPERATIONS LLC, Detroit, MI (US)

(72) Inventors: Anil Yadav, Troy, MI (US); Scott W. Lananna, Detroit, MI (US); Evan D. Griffith, Pleasant Ridge, MI (US); Anandakrishnan S, Kerala (IN); Evan J. Dawley, Bloomfield Hills, MI (US); Julian R. Sherborne, South Lyon, MI (US); Alexander M Bilinski, Avoca, MI (US); Adam W. Trumbley, Shelby Township, MI (US); Phillip D. Hamelin, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/554,686

(22) Filed: Dec. 17, 2021

(65) Prior Publication Data
US 2023/0198088 A1    Jun. 22, 2023

(51) Int. Cl.
*H01M 50/342* (2021.01)
*H01M 10/658* (2014.01)

(52) U.S. Cl.
CPC ..... *H01M 50/3425* (2021.01); *H01M 10/658* (2015.04); *H01M 2220/20* (2013.01)

(58) Field of Classification Search
CPC ........... H01M 50/3425; H01M 10/658; H01M 2220/20; H01M 50/367; H01M 50/30
See application file for complete search history.

(56) References Cited

U.S. PATENT DOCUMENTS

| 6,521,024 | B1* | 2/2003 | Akahori | H01M 50/3425 96/6 |
| 2010/0233520 | A1* | 9/2010 | Suzuki | H01M 50/121 429/56 |
| 2019/0259995 | A1* | 8/2019 | Motohashi | H01M 50/271 |
| 2019/0296293 | A1* | 9/2019 | Scharner | H01M 50/367 |
| 2019/0305392 | A1* | 10/2019 | Day | H01M 50/213 |
| 2022/0367967 | A1* | 11/2022 | Ogino | H01M 50/3425 |

(Continued)

FOREIGN PATENT DOCUMENTS

WO    WO-2021085351 A1 *  5/2021  .......... H01M 10/615

*Primary Examiner* — Sadie White
*Assistant Examiner* — Kayla Elaine Clary
(74) *Attorney, Agent, or Firm* — Quinn IP Law

(57) ABSTRACT

A battery module includes a first battery cell and a neighboring second battery cell, and an insulating member positioned therebetween. The battery module also includes a battery module enclosure surrounded by an external environment and configured to house each of the first battery cell, the second battery cell, and the insulating member. The battery module additionally includes a battery module cover mounted to the battery module enclosure. The battery module cover includes a vent feature configured to expel high temperature gases from the first battery cell and divert the high temperature gases away from the second battery cell directly to the external environment. The cover is thereby configured to minimize transfer of the high temperature gases from the first battery cell to the second battery cell and control propagation of a thermal runaway event in the battery module.

14 Claims, 6 Drawing Sheets

(56) References Cited

U.S. PATENT DOCUMENTS

2022/0416359 A1\* 12/2022 Feltham .............. H01M 50/375
2023/0178842 A1\* 6/2023 Skroski .............. H01M 50/105
429/63

\* cited by examiner

BATTERY MODULE COVER WITH THERMAL RUNAWAY MITIGATION

INTRODUCTION

The present disclosure relates to a battery module top cover configured to remove heat and mitigate a thermal runaway event in the battery module.

A battery module or array may include a plurality of battery cells in relatively close proximity to one another. Batteries may be broadly classified into primary and secondary batteries. Primary batteries, also referred to as disposable batteries, are intended to be used until depleted, after which they are simply replaced with new batteries. Secondary batteries, more commonly referred to as rechargeable batteries, employ specific chemistries permitting such batteries to be repeatedly recharged and reused, therefore offering economic, environmental and ease-of-use benefits compared to disposable batteries.

Rechargeable batteries may be used to power such diverse items as toys, consumer electronics, and motor vehicles. Particular chemistries of rechargeable batteries, such as lithium-ion cells, as well as external factors, may cause internal reaction rates generating significant amounts of thermal energy. Such chemical reactions may cause more heat to be generated by the batteries than is effectively withdrawn. Exposure of a battery cell to elevated temperatures over prolonged periods may cause the cell to experience a thermal runaway event. Accordingly, a thermal runaway event starting within an individual cell may lead to the heat spreading to adjacent cells in the module and cause the thermal runaway event to affect the entire battery array.

SUMMARY

A battery module includes a first battery cell and a neighboring second battery cell, and an insulating member positioned therebetween. The battery module also includes a battery module enclosure surrounded by an external environment, e.g., ambient environment, and configured to house each of the first battery cell, the second battery cell, and the insulating member. The battery module additionally includes a battery module cover mounted to the battery module enclosure. The battery module cover includes a vent feature configured to expel high temperature gases from the first battery cell and divert the high temperature gases away from the second battery cell directly to the external environment. The cover is thereby configured to minimize transfer of the high temperature gases from the first battery cell to the second battery cell and control propagation of a thermal runaway event in the battery module.

The battery module cover may include exhaust openings configured to expel the high temperature gases from the first battery cell. Specifically, the exhaust openings may be formed into a stamped steel battery module cover.

At least one of the exhaust openings may have a reverse scoop shape configured to direct the high temperature gases away from the second battery cell, e.g., the exhaust openings may have a cheese grater shape. The exhaust openings may be positioned relative to the first and second battery cells such that the exhaust openings expel rising high temperature gases at an uppermost or highest level of the battery module enclosure.

The battery module cover may be arranged in a cover plane that is perpendicular to the first and second battery cells. The reverse scoop shape may be configured to direct the high temperature gases at an angle that is greater than 90 and less than 180 degrees relative to the cover plane.

The vent feature may include liner segments configured to cover the exhaust openings and be blown off the exhaust openings by the high temperature gases to thereby expel the high temperature gases from the first battery cell to the external environment.

The liner segments may be glued to the battery module cover.

The subject liner segments may be constructed from mica.

The vent feature may additionally include a resilient sealing element positioned between the insulating member and the battery module cover to maintain contact with the module cover under pressure from the high temperature gases generated by the first battery cell. The resilient sealing element may thus be configured to facilitate expelling of the high temperature gases from the first battery cell to the external environment through the exhaust openings.

The resilient sealing element may include a channel configured to engage and nest the insulating member and minimize deformation of the insulating member under pressure from the high temperature gases. Additionally, the resilient sealing element may include lateral sections arranged distally from the channel and configured to maintain contact with the battery module cover under pressure from the high temperature gases and thereby minimize transfer or leakage of gases between the first and second battery cells.

The resilient sealing element may be constructed from silicone.

The battery module may additionally include a heat sink arranged opposite the battery module cover, mounted to the battery module enclosure, and configured to absorb thermal energy from the first and second battery cells.

A motor vehicle having a power-source and the above-disclosed battery module configured to supply electric energy to the power-source is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Those having ordinary skill in the art will recognize that terms such as "above," "below," "upward," "downward," "top," "bottom,", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
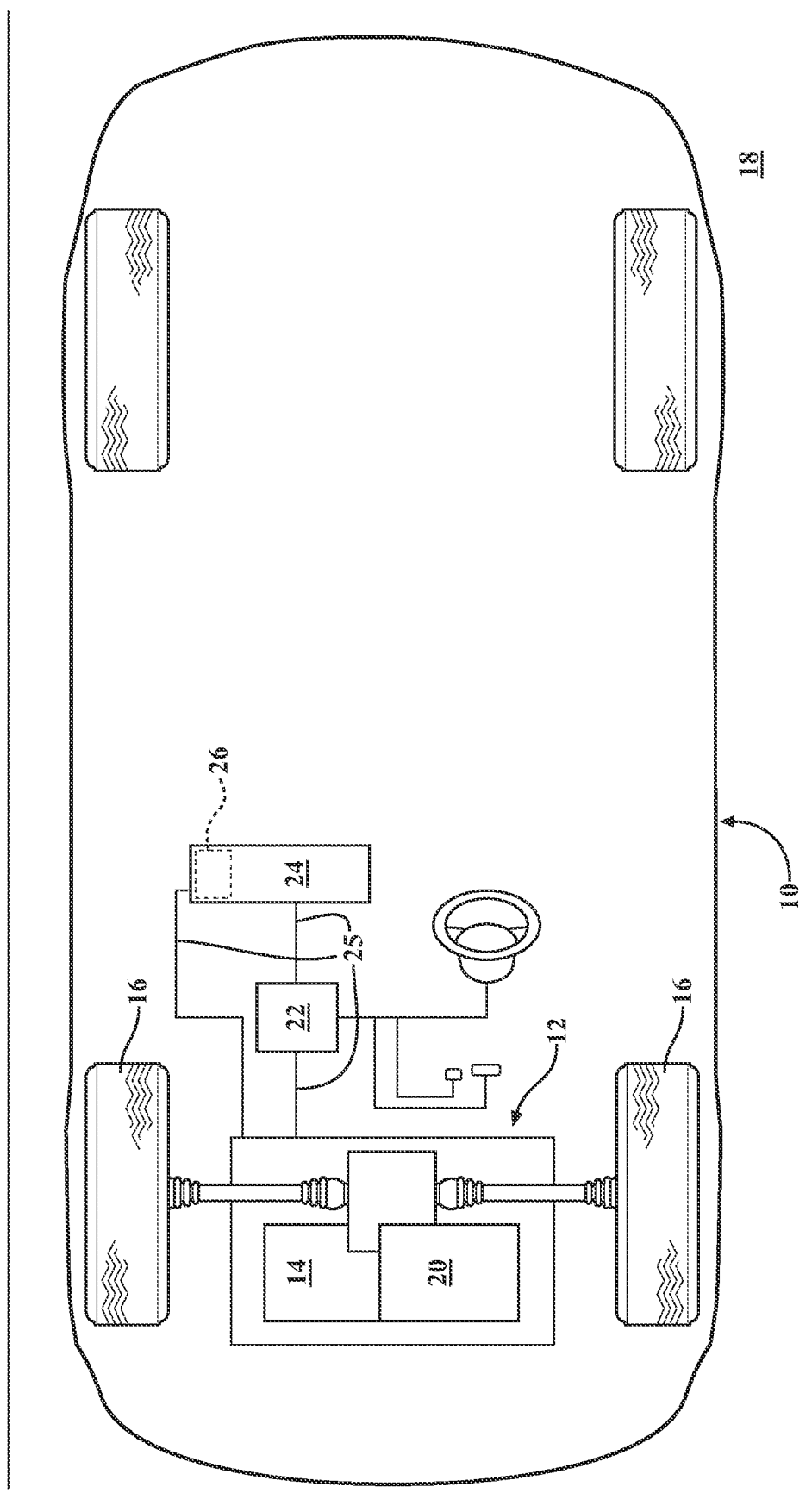
FIG. 1 is a schematic top view of an embodiment of a motor vehicle employing multiple power-sources and a battery system having battery cells arranged in module(s) configured to generate and store electrical energy.

Referring to FIG. 1, a motor vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure. The powertrain 12 includes a power-source 14 configured to generate a power-source torque T (shown in FIG. 1) for propulsion of the vehicle 10 via driven wheels 16 relative to a road surface 18. The power-source 14 is depicted as an electric motor-generator.

As shown in FIG. 1, the powertrain 12 may also include an additional power-source 20, such as an internal combustion engine. The power-sources 14 and 20 may act in concert to power the vehicle 10. The vehicle 10 additionally includes an electronic controller 22 and a battery system 24 configured to generate and store electrical energy through heat-producing electro-chemical reactions for supplying the electrical energy to the power-sources 14 and 20. The electronic controller 22 may be a central processing unit (CPU) that regulates various functions of the vehicle 10, or as a powertrain control module (PCM) configured to control the powertrain 12 to generate a predetermined amount of power-source torque T. The battery system 24 may be connected to the power-sources 14 and 20, the electronic controller 22, as well as other vehicle systems via a high-voltage BUS 25. Although the battery system 24 is described herein primarily with respect to a vehicle environment, nothing precludes the subject battery system from being employed to power other, non-automotive systems.

Figure 2:
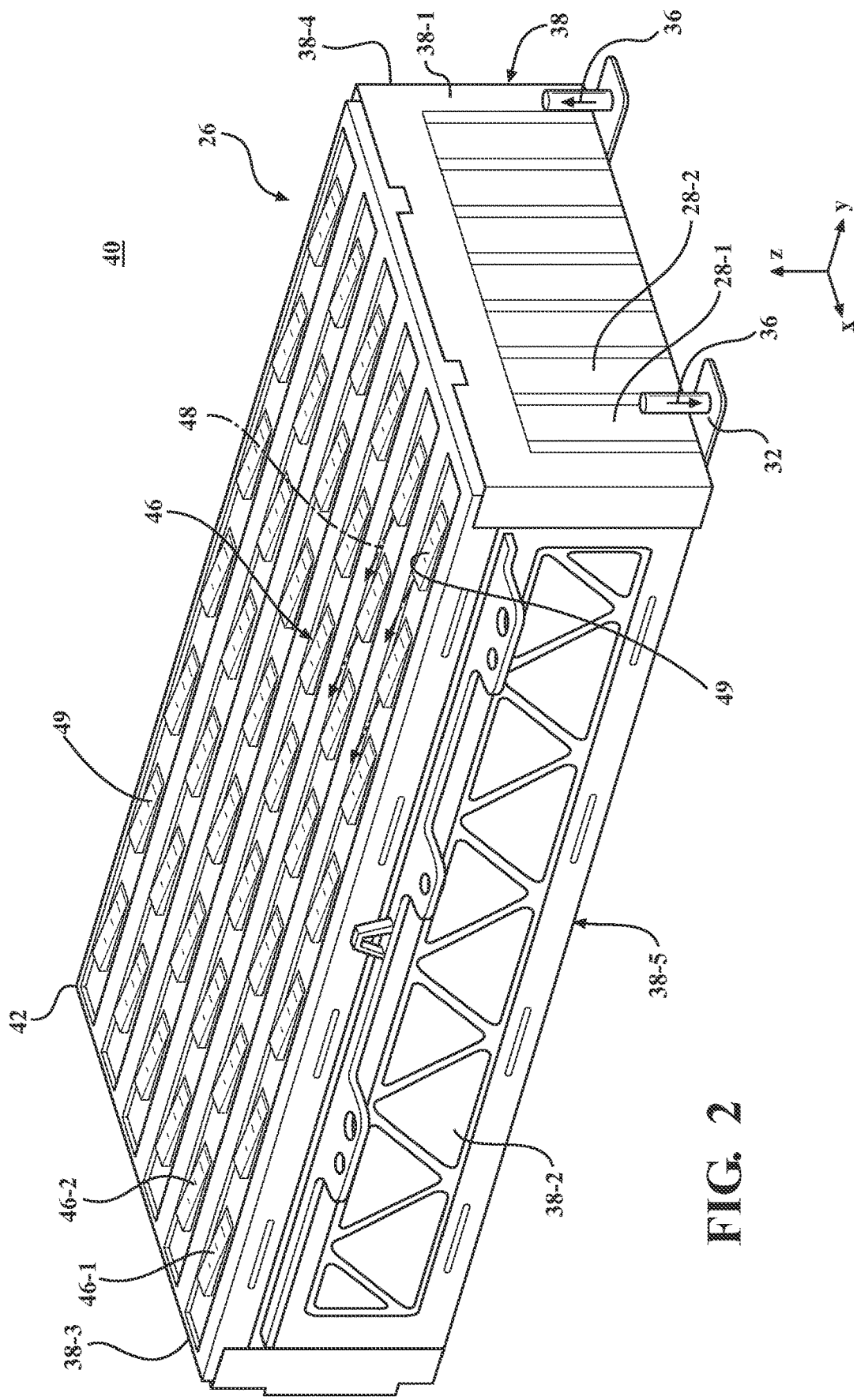
FIG. 2 is a schematic perspective view of the battery module shown in FIG. 1, having a battery module enclosure and a battery module cover with exhaust openings, according to the disclosure.

As shown in FIGS. 2-5, the battery system 24 may include one or more sections, such as a battery array or module 26. As shown in FIG. 2, the battery module 26 includes a plurality of battery cells, such as a first battery cell 28-1 and a neighboring, directly adjacent, second battery cell 28-2, each extending generally upward, i.e., in the Z direction, as seen in FIGS. 2-5. Although one module 26 and two battery cells 28-1, 28-2 are shown, nothing precludes the battery system 24 from having a greater number of such modules and battery cells. The battery module 26 also includes an insulating member or thermal barrier 30 arranged between the first battery cell 28-1 and the second battery cell 28-2. The insulating member 30 may be constructed from a high-temperature polymer foam with a stiffening substructure. The insulating member 30 is specifically configured to limit the amount of thermal energy transfer between the neighboring battery cells 28-1, 28-2 during battery module 26 operation. The insulating member 30 is further configured to maintain consistent and uniform contact with the first cell 28-1 and the second cell 28-2 during alternate expansion of the subject cells when charging and contraction of the cells when discharging.

Figure 3:
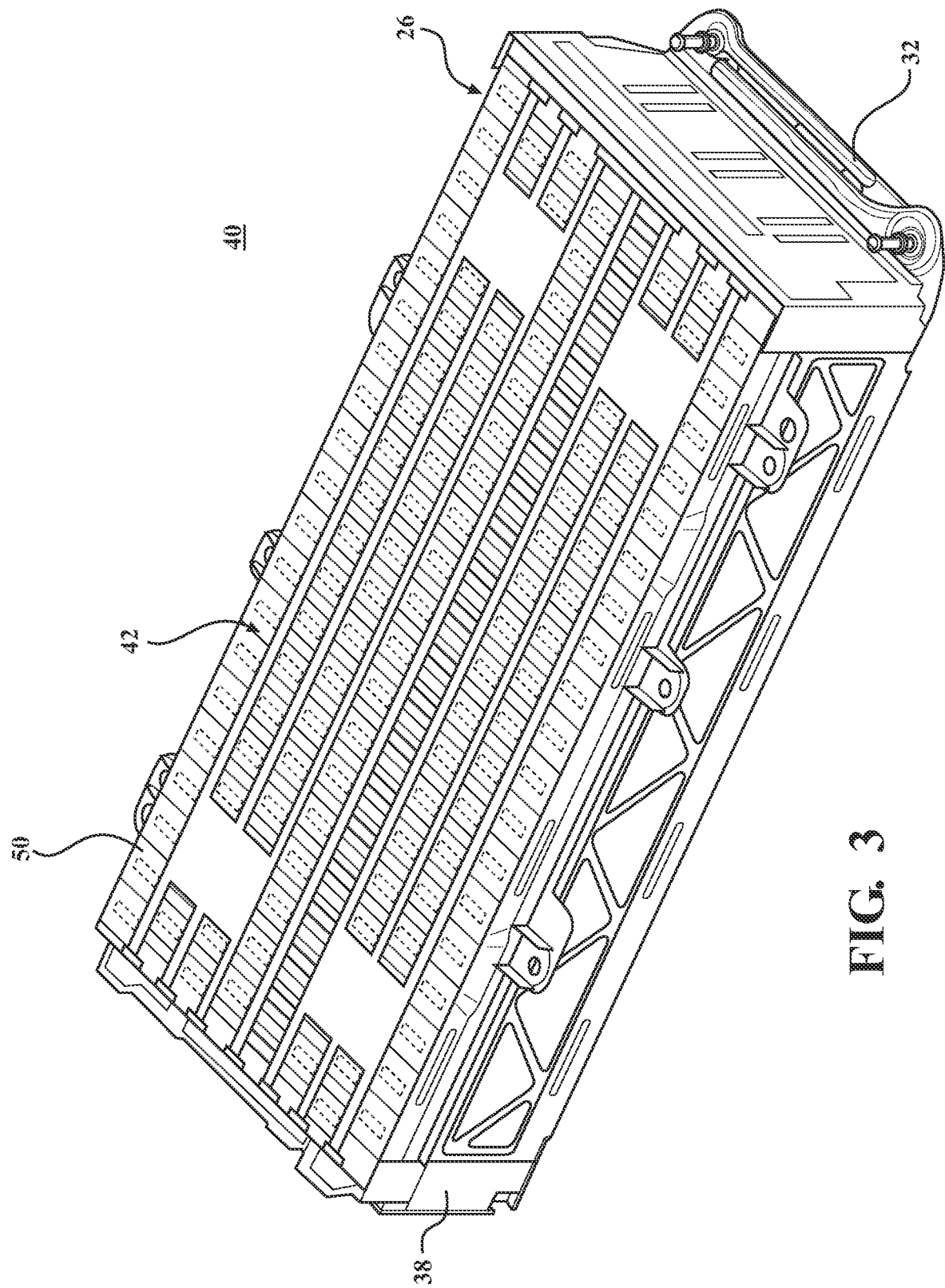
FIG. 3 is a schematic perspective view of the battery module shown in FIG. 1, having a battery module enclosure and a battery module cover with exhaust openings, wherein the battery module cover includes liner segments covering the exhaust openings, according to the disclosure.
Figure 4:
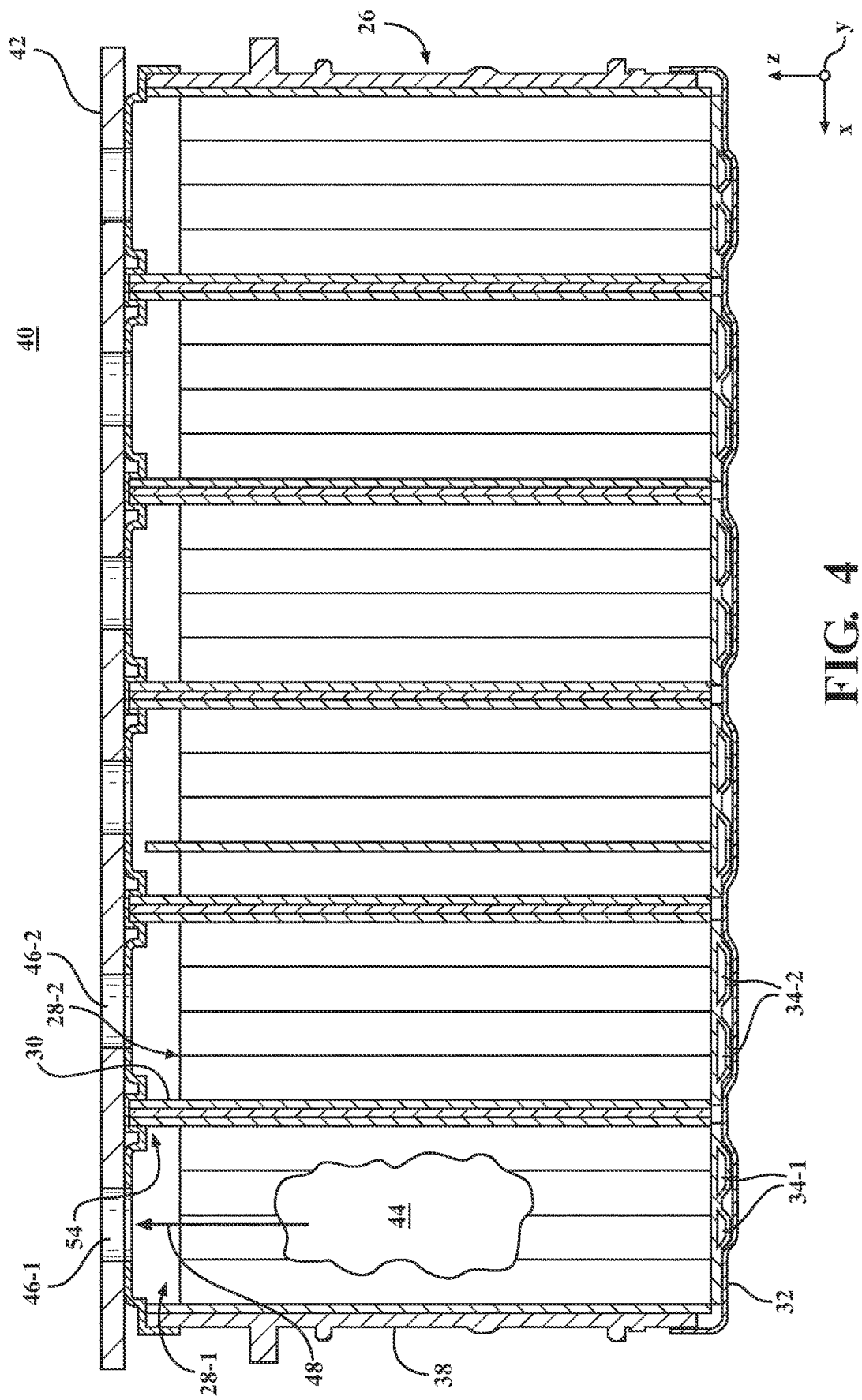
FIG. 4 is a schematic cross-sectional plan view of the battery module shown in FIG. 2, having the battery module cover with channels engaging and nesting insulating members, according to the disclosure.

As shown in FIGS. 2-5, the battery module 26 also includes a heat sink 32. The heat sink 32 is generally positioned below and in direct contact with each of the first battery cell 28-1 and the second battery cell 28-2 to thereby absorb thermal energy from the first and second battery cells. As shown, the heat sink 32 may be in direct physical contact with the first and second battery cells 28-1, 28-2. The heat sink 32 may be configured as a coolant plate having a plurality of coolant channels, shown as respective first and second coolant channels 34-1 and 34-2 in FIG. 4. The coolant channels 34-1, 34-2 are specifically configured to circulate a coolant 36 (shown in FIG. 2) and thereby remove thermal energy from the first and second battery cells 28-1, 28-2 while the battery module 26 generates/stores electrical energy. As shown in FIG. 4, the first coolant channel 34-1 may be arranged proximate the first battery cell 28-1 and the second coolant channel 34-2 may be arranged proximate the second battery cell 28-2.

Generally, during normal operation of the module 26, the insulating member 30 is effective in absorbing thermal energy released by the first and second cells 28-1, 28-2 and facilitating transfer of the thermal energy to the heat sink 32. However, during extreme conditions, such as during a thermal runaway event (identified via numeral 44 in FIG. 4), the amount of thermal energy released by the cell undergoing the event will typically saturate the insulating member 30 and exceed its capacity to absorb and efficiently transfer heat to the heat sink 32. As a result, excess thermal energy will typically be transferred between the neighboring cells 28-1, 28-2, leading to propagation of the thermal runaway through the battery module 26. The term "thermal runaway event" generally refers to an uncontrolled increase in temperature in a battery system. During a thermal runaway event, the generation of heat within a battery system or a battery cell exceeds the dissipation of heat, thus leading to a further increase in temperature. A thermal runaway event may be triggered by various conditions, including a short circuit within the cell, improper cell use, physical abuse, manufacturing defects, or exposure of the cell to extreme external temperatures.

As shown in FIGS. 2-5, the battery module 26 also includes a battery module enclosure 38 surrounded by an environment external to the battery module enclosure or ambient environment 40. The battery module enclosure 38 is configured to house each of the first battery cell 28-1, the second battery cell 28-2, the insulating member 30, and the heat sink 32. As specifically indicated in FIG. 2, the battery module enclosure 38 includes lateral walls, 38-1, 38-2, 38-3, 38-4, as well as a floor 38-5 mounting or incorporating the heat sink 32. The battery module 26 also includes a battery module cover 42 generally positioned above the first and second battery cells 28-1, 28-2 and attached to the lateral walls 38-1, 38-2, 38-3, 38-4 of the battery module enclosure 38. For example, in the event the first battery cell 28-1 experiences thermal runaway, the excess gases generated by such an event would give rise to highly elevated internal pressures having tendency to distort the battery module cover 42 and permit the gases to pass over or leak around the insulating member 30 to the neighboring second battery cell 28-2. Such leakage of high temperature gases would increase the likelihood of the thermal runaway in the battery module 26 from the first battery cell 28-1 to the second battery cell 28-2, thereby generating a chain reaction and affecting the entire battery module.

As shown, the battery module cover 42 is arranged in an X-Y plane, substantially parallel to the heat sink 32, and generally perpendicular to the first and second battery cells 28-1, 28-2. The battery module cover 42 is mounted to the battery module enclosure 38 and includes a vent feature 46 configured to expel high temperature gases from one of the first and second battery cell 28-1, 28-2. The vent feature 46 is additionally configured to divert, i.e., deflect or reroute, the high temperature gases away from the second battery cell directly to the ambient environment 40. The battery module cover 42 is thereby configured to minimize transfer of the high temperature gases from one of the first and second battery cell 28-1, 28-2, to the other of the two cells and control propagation of a thermal runaway event 44 in the battery module 26. Although either the first battery cell 28-1 or the second battery cell 28-2 may generate high temperature gases due to the thermal runaway event 44, the present disclosure will specifically focus on an exemplary case when the first battery cell generates the subject gases.

With specific reference to FIG. 2, the vent feature 46 may include an array of exhaust openings, depicted as a first set of exhaust openings 46-1 corresponding to the first battery cell 28-1 and a second set of exhaust openings 46-2 corresponding to the second battery cell 28-2. The battery module cover 42 may be formed, such as stamped, from mild steel with the exhaust openings 46 formed into the battery module cover. The exhaust openings 46-1, 46-2 are arranged relative to the first and second battery cells 28-1, 28-2 such that the exhaust openings expel rising high temperature gases from an uppermost/highest level within the battery module enclosure 38. Particularly, the exhaust openings 46-1 are configured to operate in a manner of a chimney to expel the high temperature gases 48 from the first battery cell 28-1 undergoing the thermal runaway event 44 and divert the high temperature gases away from the second battery cell 28-2 by providing a direct path to the ambient environment 40.

As shown in FIG. 2, the exhaust openings 46-1, 46-2 may have a reverse scoop shape 49 configured to direct the high temperature gases 48 generated by the first battery cell 28-1 away from the second battery cell 28-2. The reverse scoop shape 49 may be specifically configured to direct the high temperature gases 48 at an angle greater than 90 and smaller than 180 degrees relative to the cover X-Y plane. The array of vent openings, such as having the first and second exhaust openings 46-1, 46-2, with the subject reverse scoop shape 49 may be generally defined as having a directional "cheese grater" profile relative to the environment 40. The reverse scoop shape 49 of the exhaust openings may be formed, e.g., stamped, directly into the structure of the battery module cover 42.

As shown in FIG. 3, the vent feature 46 may include liner segments 50 affixed to the battery module cover 42 configured to cover respective exhaust openings, e.g., the first exhaust opening 46-1 and the second exhaust opening 46-2. The liner segments 50 are specifically configured to be either partially or entirely blown off the exhaust opening 46-1 via the pressure from the high temperature gases 48. Such uncovering of the exhaust opening 46-1 by the high temperature gases 48 will permit the battery module cover 42 to expel the high temperature gases 48 from the battery cell 28-1 to the ambient environment 40. The liner segments 50 may, for example, be constructed from mica for the subject material's resistance to elevated temperatures and be glued to the battery module cover 42 over the exhaust openings 46. The glue employed to attach the liner segments 50 may be specifically selected to maintain attachment of the liner segments to the battery module cover 42 under normal module operating conditions and give way under high gas pressure during a thermal runaway.

Figure 5:
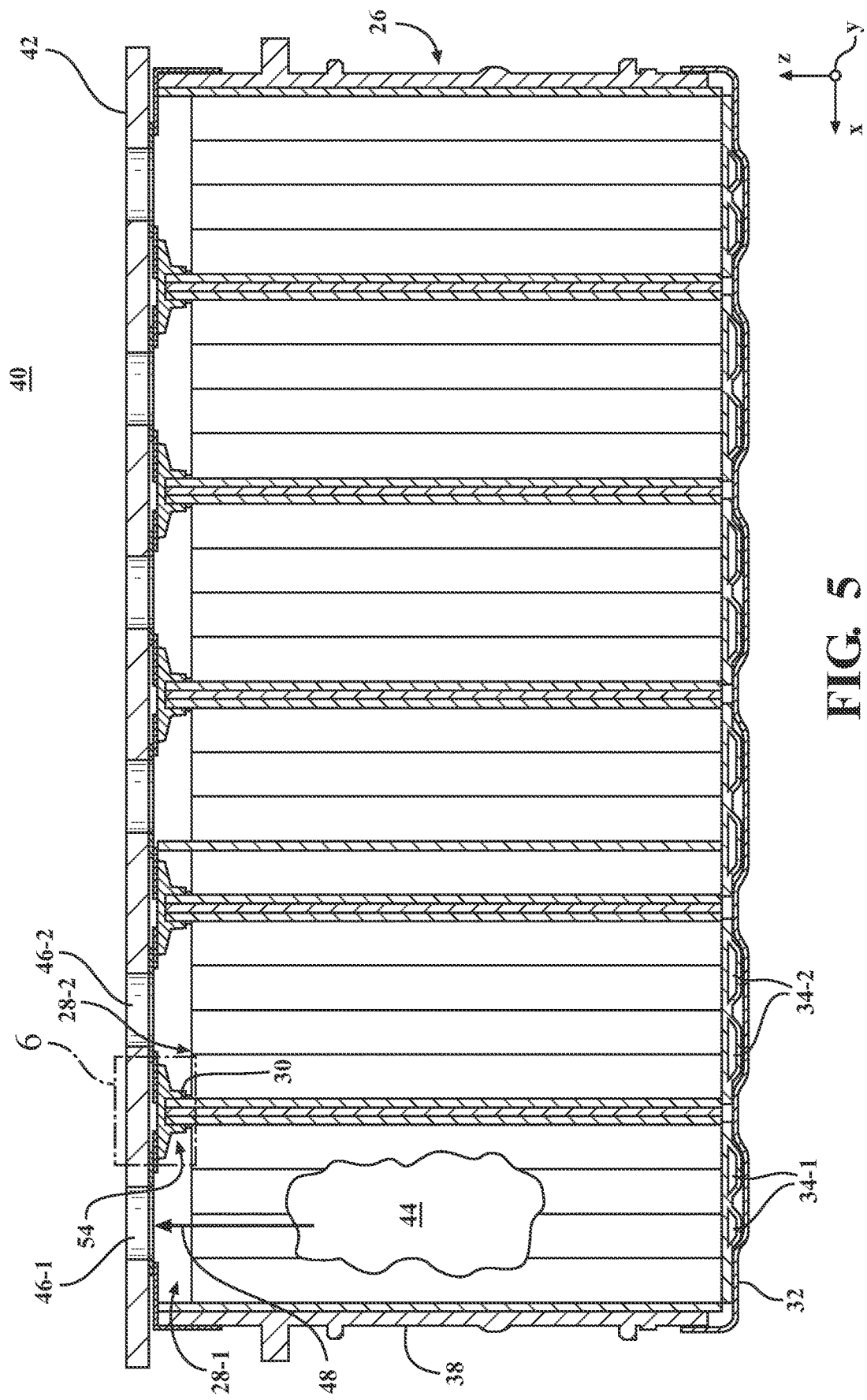
FIG. 5 is a schematic cross-sectional plan view of the battery module shown in FIG. 2, having resilient sealing elements positioned between insulating members and the battery module cover, the resilient sealing elements having channels engaging and nesting insulating members, according to the disclosure.
Figure 6:
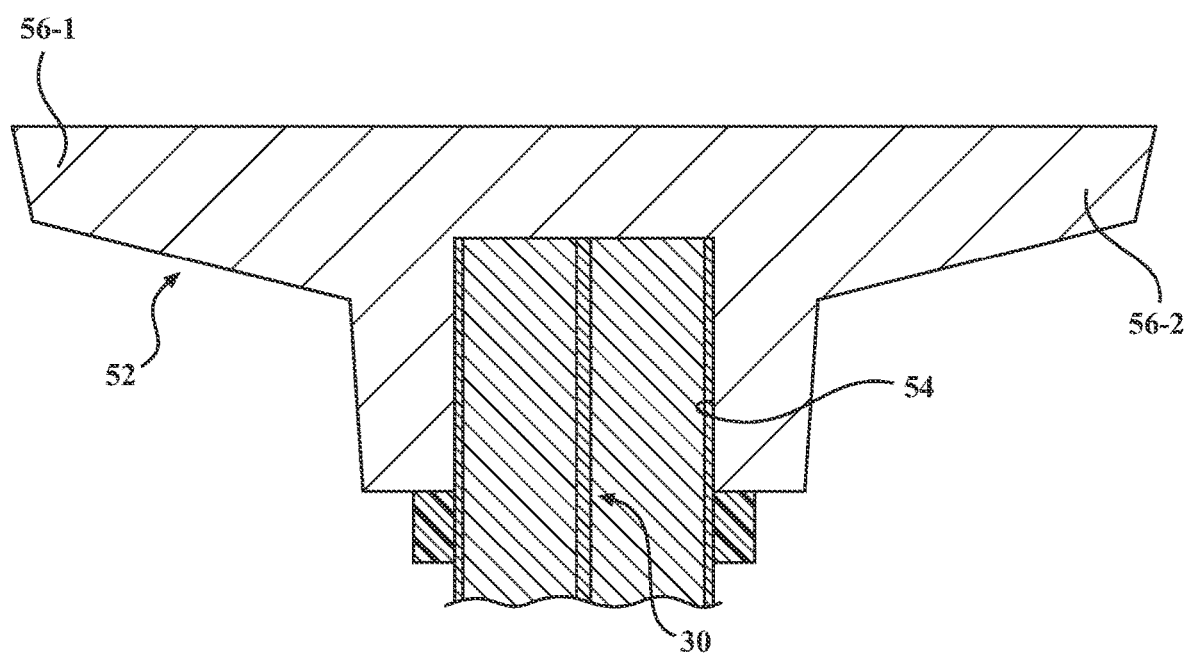
FIG. 6 is a schematic close-up view of a particular section of the battery module shown in FIG. 5, depicting a cross-section of the resilient sealing element, according to the disclosure.

As shown in FIGS. 5-6, the vent feature 46 may additionally include resilient sealing elements 52. Each sealing element 52 may be positioned between the respective insulating member 30 and the battery module cover 42. The resilient sealing elements 52 may be constructed from a heat resistant flexible material, such as silicone. The resilient sealing elements 52 are specifically configured to maintain contact with the battery module cover 42 under pressure from the high temperature gases generated by the battery cells 28-1, 28-2. The resilient sealing elements 52 thereby facilitate expelling of, for example, the high temperature gases 48 from the first battery cell 28-1 to the ambient environment 40 through the exhaust openings 46.

FIG. 6 is a close-up view of section 6 shown in FIG. 5. As illustrated in FIG. 6, each resilient sealing element 52 may include, i.e., define, a channel 54 configured to engage and nest the insulating member 30. Such construction of the interface between the resilient sealing element 52 and the insulating member 30 is intended to minimize deformation of the subject insulating member under pressure, such as from high temperature gases 48. Each resilient sealing element 52 may further include lateral sections 56-1 and 56-2 arranged distally from the channel 54. The lateral sections 56-1 and 56-2 are configured to maintain contact with the battery module cover 42 under pressure from the high temperature gases, such as the gases 48, to thereby minimize transfer or leakage of the subject gases between the first and second battery cells 28-1, 28-2. Alternatively, as shown in FIG. 4, the channel(s) 54 may be incorporated directly into the battery module cover 42 to engage and nest the insulating member(s) 30 to maintain separation between the respective battery cells, e.g., the first and second battery cells 28-1, 28-2, and minimize deformation of the respective insulating member(s) under increased pressures.

Overall, during operation of the battery module 26, the vent feature 46 is configured to automatically transfer directly to the ambient environment excess thermal energy generated by a thermal runaway event in a particular battery cell of the battery module. Such transfer of the excess thermal energy out of the battery module 26 is intended to control propagation of thermal runaway to other, neighboring cells in the battery module. Specifically, the vent feature 46 may include exhaust openings. e.g., 46-1, 46-2, and supporting structures to minimize transfer of high temperature gases from the battery cell undergoing the thermal runaway to a neighboring battery cell, and thereby facilitate the transfer of such gases to the ambient environment 40. Thus, the battery module cover 42 with the vent feature 46 is particularly effective in mitigating propagation of a thermal runaway between individual battery cells within the battery module 26, without requiring additional external hardware or controls.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A battery module comprising:
a first battery cell, a neighboring second battery cell, and an insulating member positioned therebetween;
a battery module enclosure surrounded by an external environment and configured to house each of the first battery cell, the second battery cell, and the insulating member; and
a battery module cover mounted to the battery module enclosure and including a vent feature configured to expel high temperature gases from the first battery cell and divert the high temperature gases away from the second battery cell directly to the external environment, to thereby minimize transfer of the high temperature gases from the first battery cell to the second battery cell and control propagation of a thermal runaway event in the battery module;
wherein:
the vent feature includes exhaust openings configured to expel the high temperature gases from the first battery cell and a resilient sealing element positioned between the insulating member and the battery module cover and configured to maintain contact with the battery module cover under pressure from the high temperature gases generated by the first battery cell and facilitate expelling of the high temperature gases from the first battery cell to the external environment through the exhaust openings; and
wherein the resilient sealing element includes:
a channel configured to engage and nest the insulating member and minimize deformation of the insulating member under pressure from the high temperature gases; and
lateral sections arranged distally from the channel and configured to contact the high temperature gases and maintain contact with the battery module cover under pressure from the high temperature gases to thereby minimize transfer of gases between the first and second battery cells.

2. The battery module of claim 1, wherein the vent feature includes liner segments configured to cover the exhaust openings and be blown off the exhaust openings by the high temperature gases to thereby expel the high temperature gases from the first battery cell to the external environment.

3. The battery module of claim 2, wherein the liner segments are glued to the battery module cover.

4. The battery module of claim 2, wherein the liner segments are constructed from mica.

5. The battery module of claim 1, wherein the resilient sealing element is constructed from silicone.

6. A motor vehicle comprising:
a power-source configured to generate power-source torque; and
a battery module configured to supply electrical energy to the power-source, the battery system including:
a first battery cell, a neighboring second battery cell, and an insulating member positioned therebetween;
a battery module enclosure surrounded by ambient environment and configured to house each of the first battery cell, the second battery cell, and the insulating member; and
a battery module cover mounted to the battery module enclosure and including a vent feature configured to expel high temperature gases from the first battery cell and divert the high temperature gases away from the second battery cell directly to the ambient environment to thereby minimize transfer of the high temperature gases from the first battery cell to the second battery cell and control propagation of a thermal runaway event in the battery module;
wherein the vent feature includes:
exhaust openings configured to expel the high temperature gases from the first battery cell; and
a resilient sealing element positioned between the insulating member and the battery module cover and configured to maintain contact with the battery module cover under pressure from the high temperature gases generated by the first battery cell and facilitate expelling of the high temperature gases from the first battery cell to the ambient environment through the exhaust openings; and
wherein the resilient sealing element includes:
a channel configured to engage and nest the insulating member and minimize deformation of the insulating member under pressure from the high temperature gases; and
lateral sections arranged distally from the channel and configured to contact the high temperature gases and maintain contact with the battery module cover under pressure from the high temperature gases to thereby minimize transfer of gases between the first and second battery cells.

7. The battery module of claim 1, wherein at least one of the exhaust openings has a reverse scoop shape configured to direct the high temperature gases away from the second battery cell.

8. The battery module of claim 7, wherein the battery module cover is arranged in a cover plane, and wherein the reverse scoop shape is configured to direct the high temperature gases at an angle greater than 90 and smaller than 180 degrees relative to the cover plane.

9. The motor vehicle of claim 6, wherein:
at least one of the exhaust openings has a reverse scoop shape configured to direct the high temperature gases away from the second battery cell;
the battery module cover is arranged in a cover plane; and
the reverse scoop shape is configured to direct the high temperature gases at an angle greater than 90 and smaller than 180 degrees relative to the cover plane.

10. The motor vehicle of claim 6, wherein the vent feature includes liner segments configured to cover the exhaust openings and be blown off the exhaust openings by the high temperature gases to thereby expel the high temperature gases from the first battery cell to the ambient environment.

11. The motor vehicle of claim 10, wherein the liner segments are glued to the battery module cover.

12. The motor vehicle of claim 10, wherein the liner segments are constructed from mica.

13. The motor vehicle of claim 6, wherein the resilient sealing element is constructed from silicone.

14. A motor vehicle comprising:
a power-source configured to generate power-source torque; and
a battery module configured to supply electrical energy to the power-source, the battery module including:
- a first battery cell, a neighboring second battery cell, and an insulating member positioned therebetween;
- a battery module enclosure surrounded by ambient environment and configured to house each of the first battery cell, the second battery cell, and the insulating member; and
- a battery module cover mounted to the battery module enclosure and including exhaust openings configured to expel high temperature gases from the first battery cell and divert the high temperature gases away from the second battery cell directly to the ambient environment to thereby minimize transfer of the high temperature gases from the first battery cell to the second battery cell and control propagation of a thermal runaway event in the battery module;

wherein:
- the battery module cover is arranged in a cover plane; and
- the reverse scoop shape is configured to direct the high temperature gases at an angle greater than 90 and smaller than 180 degrees relative to the cover plane; and
- a resilient sealing element positioned between the insulating member and the battery module cover and configured to maintain contact with the battery module cover under pressure from the high temperature gases generated by the first battery cell and facilitate expelling of the high temperature gases from the first battery cell to the ambient environment through the exhaust openings;

wherein the resilient sealing element includes:
- a channel configured to engage and nest the insulating member and minimize deformation of the insulating member under pressure from the high temperature gases; and
- lateral sections arranged distally from the channel and configured to contact the high temperature gases and maintain contact with the battery module cover under pressure from the high temperature gases to thereby minimize transfer of gases between the first and second battery cells.

* * * * *